INVENTOR.
Austin A. Holbeck

Aug. 11, 1953 — A. A. HOLBECK — 2,648,298
MACHINE FOR UNLOADING CONTINUOUS BAKING OVENS
Filed Sept. 27, 1950 — 3 Sheets-Sheet 2

INVENTOR.
Austin A. Holbeck
BY
Barnes, Kisselle, Laughlin & Raisch
Attorneys.

INVENTOR.
Austin A. Holbeck
BY
Barnes, Kisselle, Laughlin & Raisch
Attorneys.

Patented Aug. 11, 1953

2,648,298

UNITED STATES PATENT OFFICE 2,648,298

MACHINE FOR UNLOADING CONTINUOUS BAKING OVENS

Austin A. Holbeck, Detroit, Mich.

Application September 27, 1950, Serial No. 187,058

11 Claims. (Cl. 107—57)

1

This invention relates to the unloading of continuous baking ovens. The machine will automatically depan the bread or other baked product and deliver the pans to one receiving hopper and the bread or other baked products to another hopper. The hoppers deliver the pans and baked products to conveyors by which they are carried away to be treated in the customary way.

This results in much labor saving and is a great improvement from a sanitation standpoint as it avoids contact of the human hands with the bread.

The apparatus is comparatively simple and can easily be installed with any continuous or automatic baking oven which delivers the bread out of the oven by means of a conveyor.

Referring to the drawings.

Figures 1, 2:
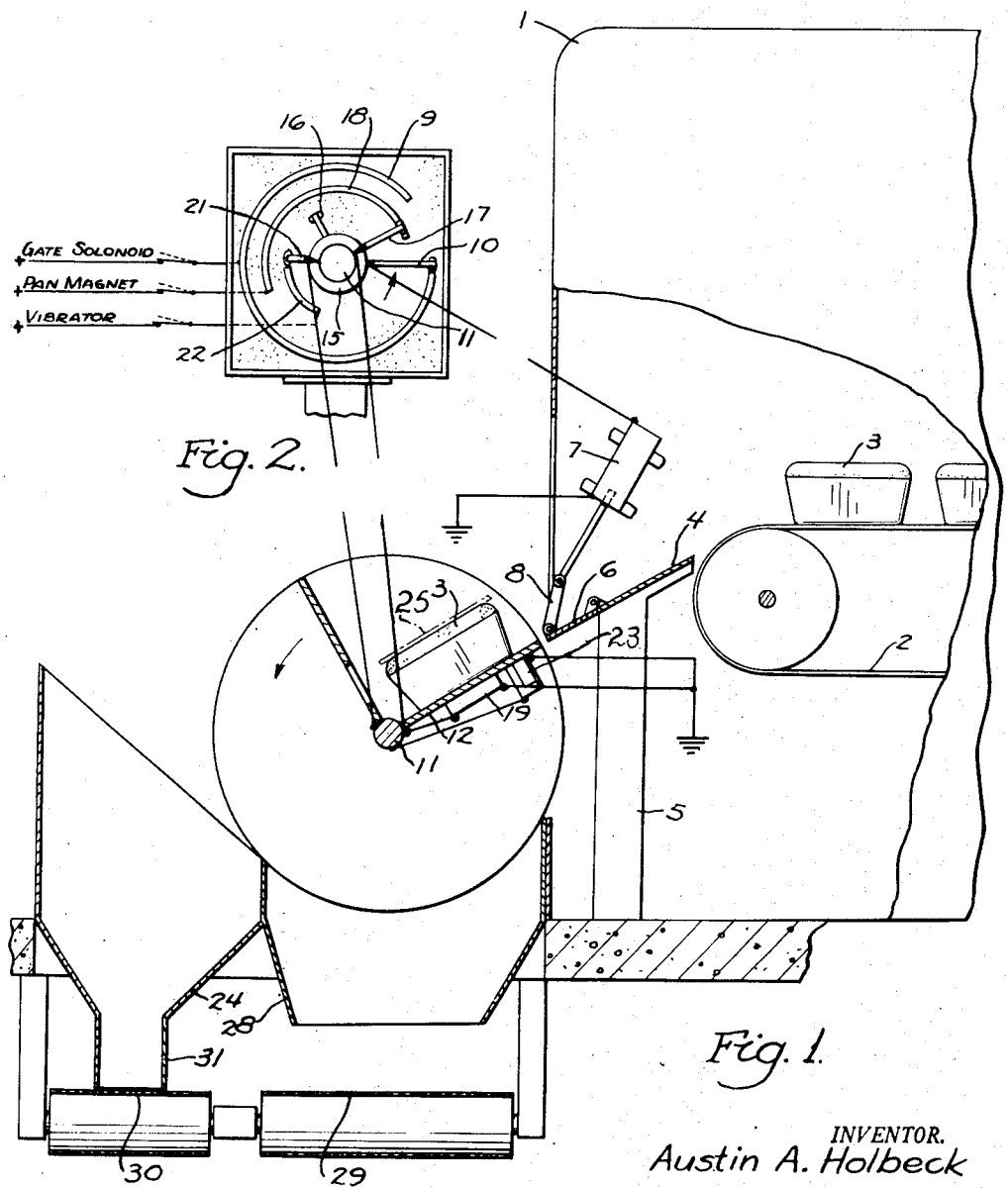
Fig. 1 is a vertical section of the apparatus showing a fragmentary elevation of the oven but broken away.
Fig. 2 is a front elevation of the switch which controls the operating parts. The view is taken on line 2—2 of Fig. 5.
Figure 3:
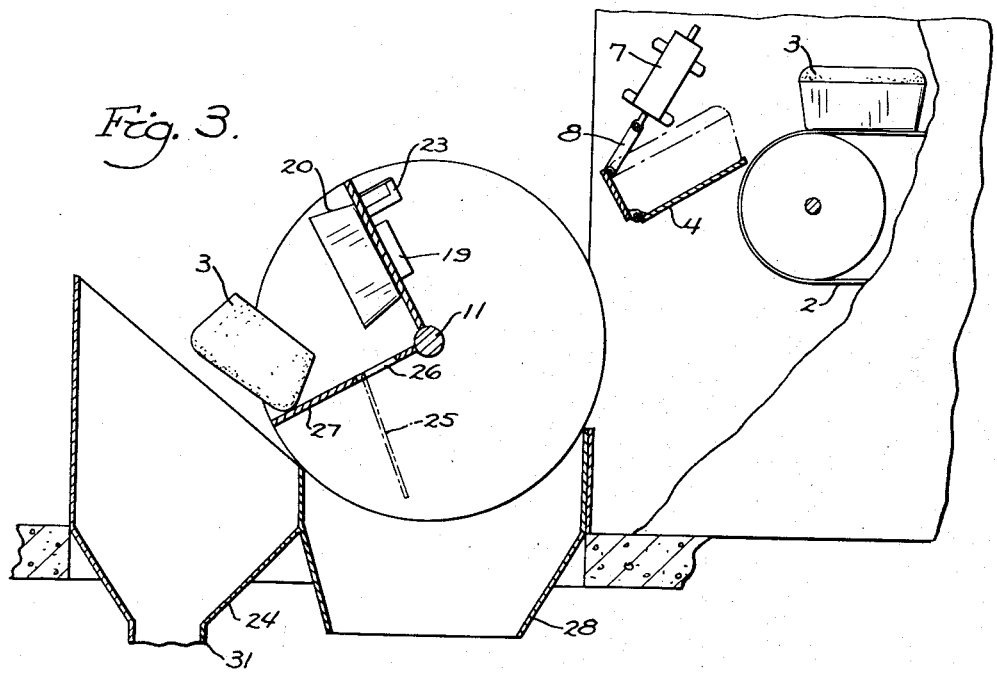
Fig. 3 is a view similar to Fig. 1 showing one set of loaves sliding onto the unloading hearth and another set of loaves being depanned.

The continuous baking oven is designated 1. It may be an infra-red ray baking oven, or another form of heat may be used. A belt conveyor 2 brings the baked bread or other baked product to the delivery end of the oven where the loaves 3 slide off onto the inclined hearth 4 supported upon the stanchions 5. This inclined hearth has a hinged section or gate 6 controlled by the solenoid 7 and link 8. When the bread is ready to slide off the end of the conveyor the switch arm 10 (Fig. 2) has just engaged the segment 9 of the controller and this energizes the solenoid and lifts the gate 6 as shown in Fig. 3. When the unloader wheel shelf 12 nears registry with the inclined hearth 4 the controller switch arm 10 drops off the end of the segment 9 and the gate solenoid is deenergized and drops the gate. The bread slides onto the revolving shelf 12 as shown in Fig. 1.

Figure 5:
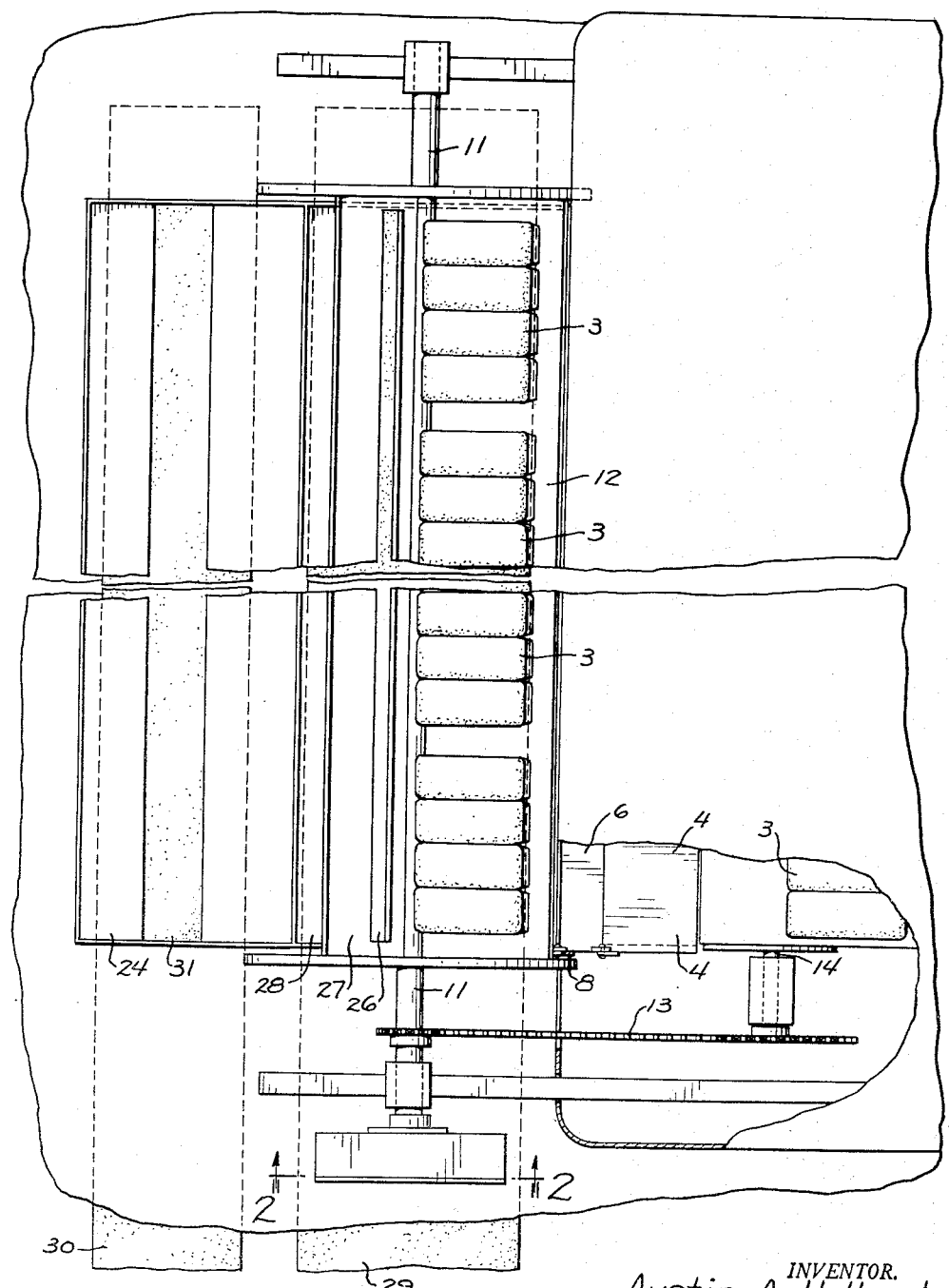
Fig. 5 is a plan view of the apparatus and the delivery end of the oven.

The unloader 11 continues to revolve counterclockwise. It is operated in timed relation with the bread conveyor by the chain drive 13 from the conveyor shaft 14 (Fig. 5). The controller switch arms are secured to a hub 15 secured to unloader shaft 11 by set screw 16. Hence the unloader, the controller switch arms and the conveyor are all driven in close synchronism.

2

Shortly after the switch arm 10 has passed off the segment 9 and deenergized the solenoid, switch arm 17 contacts the segment 18 which controls the magnets 19. These magnets hold the pans 20 from falling off as the wheel revolves through 90° to the position shown in Fig. 3. At about the same time the magnets are energized, switch arm 21 contacts segment 22 to actuate an electrical vibrator 23. This vibrator shakes the bread or other baked product and frees it from the pan so that the loaves drop out, as shown in Fig. 3, into the bread hopper 24.

Figure 4:
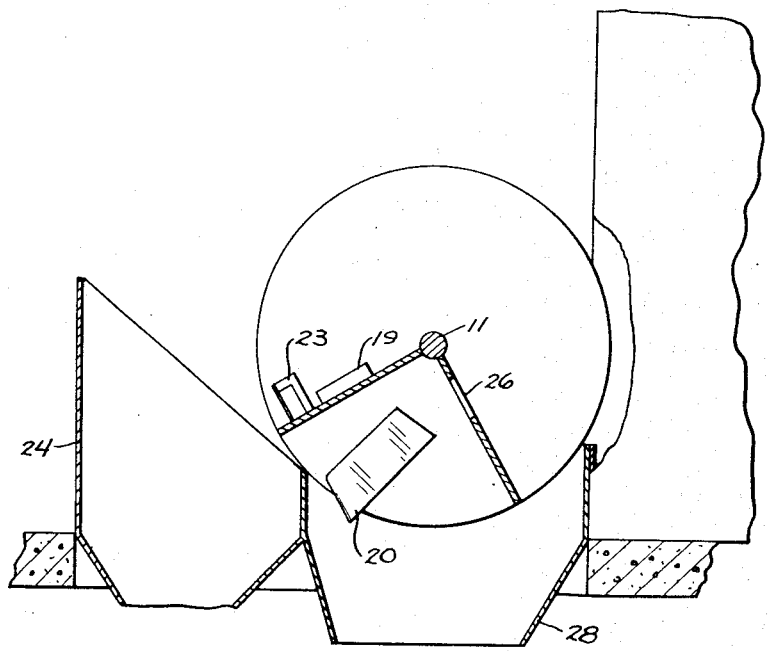
Fig. 4 shows the unloader wheel dropping the pans into the pan hopper.

Some baked products are baked with covers 25 over the pans. These covers drop through the slots 26 in the shelf 27 and fall into the pan hopper. The unloader wheel, after turning through 180° as shown in Fig. 4, drops the pans in the pan hopper 28, the magnets at this point being deenergized by switch arm 17 passing the end of segment 18 of the controller. The bread or other baked products pass through the chute 31 onto the belt conveyor 30 and the pans and any covers drop onto the conveyor belt 29. The conveyors carry away the bread, baked products, pans and covers to other locations to be further processed or treated.

The number of loaves in a row can be any number. This machine is designed to handle twenty, although that exact number does not show in the broken away plan view of Fig. 5. There will be one or more electromagnets 19, and one or more vibrators will be used.

Alternating electric current is supplied from a source (not shown) to gate solenoid segment 9, pan electromagnet segment 18, and vibrator segment 22 through leads bearing corresponding legends (Fig. 2).

In the case of solenoid 7, the controller arm 10 extends radially from the hub 15 and contacts segment 9, permitting the alternating current to flow to a collector ring attached to the hub 15, from whence it is connected to solenoid 7. When the circuit is closed by contact of arm 10 with segment 9, the plunger of the solenoid is pulled up raising the gate 8. Likewise when the contact arm 10 moves off the segment 9 the solenoid is deenergized, the plunger falls and the gate is opened.

The alternating current solenoids called CR 9503 manufactured by General Electric Schenectady, N. Y., are well adapted for my purpose.

In the case of the electromagnet 19, the controller arm 17 extends radially from hub 15 and contacts segment 18, permitting the alternating current to flow to a lead attached to the base of the arm 17, this lead extending along the shaft 11 to the shelf 12 beneath which is attached a rectifier to convert the alternating current to direct current to operate a number of these electromagnets 19, placed at intervals to span the width of the shelf and wired in series. When the controller arm 17 is in contact with segment 18, the electromagnets are energized; the pans are held to the shelf until the electromagnets are deenergized by the controller arm 17 running off the segment 18. The alternating current rectifier and direct current electromagnets are supplied by Ding's Magnetic Separator Co., 4740 W. McGeogh Ave., Milwaukee 14, Wis. The rectifier is part of the member 19 shown in the drawings.

In the case of the electro-vibrator the controller arm 21 extends radially from the hub 15 to the segment 22 permitting the alternating current to flow to a lead attached to the base of the arm 21, this lead extending along the shaft 11 to the shelf 12 beneath which is attached a vibrator control which converts the A. C. current into pulsating D. C. current. The vibrator controller or rectifier which is housed in the controller casing 23 allows the passage of the A. C. current in only one direction, hence converts the current into pulsating D. C. current. The vibrator has one or more electromagnets or windings which, when energized, separate the armature or armatures from the metal shelf 12 against which it or they are pressed by coiled springs.

Each time a gap comes in the electric current the electromagnets or windings release the armatures and the coil springs slap the armatures against the shelf. A suitable vibrator and a vibrator controller for this purpose is manufactured by the W. S. Tyler Company, Cleveland 14, Ohio. The model V-9 controller and vibrator is well adapted for my purpose.

The electromagnets and vibrators may be grounded on the unloader shaft, as indicated on the drawings, or connected by leads to a common collector ring on shaft 11 and through a brush and lead to the return circuit and source of supply. In the case of the solenoid 7, the current could also be connected with the return circuit or grounded on the metal walls of the oven 1, as indicated in the drawings. The solenoid requires no rectification of the current, since the pulsations are so rapid as not to release the solenoid plunger.

Inasmuch as the electric circuits to the electromagnets and vibrators are run along the shaft 11, they are in fixed relation to the controller arms, magnets and vibrators all of which revolve together with the unloading wheel.

What I claim is:

1. An automatic unloader for use with baking ovens delivering the baked bread or other products by a conveyor in sets, having in combination an inclined hearth for registering with the delivery end of the conveyor and onto which the bread or baked products slide as the same is passed off the end of the conveyor, means for temporarily arresting the sliding products on the hearth to await the unloader, an unloader wheel turning in synchronism with the conveyor and having a shelf arranged to register at one time with the hearth at which time the arresting means is released to allow the bread or baked products to slide onto the shelf of the unloader, means on the shelf for holding the pans thereto while the shelf is revolved to positions where the pans drop off, a vibrator on the shelf to release the products from the pans and allow the dumping of the bread or baked products from the pans as the wheel revolves, the pan holding means releasing the pans as the wheel travels further to drop the pans at a different location from where the bread or baked products were released.

2. The combination claimed in claim 1 in which the means for holding the pans on the shelf comprises electromagnets controlled by a controller switch in step with the revolution of the unloader wheel so as to hold the pans as soon as they slide onto the shelf and to release the pans after the baked goods have been shaken loose from the pans and dumped.

3. The combination claimed in claim 1 in which the means for temporarily arresting the bread or other products upon the hearth is a swinging lower hearth section controlled by a solenoid in turn controlled by a controller switch in synchronism with the turning of the unloader wheel.

4. The combination claimed in claim 1 in which the unloader wheel has two shelves angularly spaced from one another, the one on which the pans are held and the other to arrest the sliding of the bread on the first mentioned shelf.

5. The combination claimed in claim 4 in which the arresting shelf has slots through which covers on the pans may be discharged.

6. The combination claimed in claim 1 in which the holding means for the pans are properly timed and controlled electromagnets and the arresting means for the baked product on the hearth is a hinged hearth section controlled by a solenoid which is energized and deenergized to arrest the bread and then allow it to slide off onto the shelf of the unloader having the magnets.

7. The combination claimed in claim 1 in which a bread receiving hopper is located below the place where the bread or baked products are dumped from the pans and a pan hopper is located under the point on the revolution of the unloader where the pans are released from the shelf.

8. The combination claimed in claim 7 in which both hoppers having openings in their bottoms and each has a conveyor below the opening, one conveyor for carrying off the bread and the other conveyor for carrying off the pans.

9. An automatic unloader for use with baking ovens delivering the baked bread or other products by conveyor in sets of pans and the baked goods, having in combination a declining stationary hearth for registering with the delivery end of the conveyor and onto which the bread or baked products in pans slide as the same is passed off the conveyor, a gate for arresting the sliding products in pans on the hearth, a solenoid for operating the gate, an unloader wheel turning in synchronism with the conveyor and having a shelf arranged to register at one point in the revolution with the lower end of the hearth, a vibrator secured to the shelf for vibrating the pans and baked products, magnets on the shelf for holding the pans on the shelf when the wheel turns so that the shelf is so inclined that otherwise the pans would be discharged, and a controller operating in synchronism with the rotation of the unloading wheel for energizing the solenoid that controls the gate to drop the gate to allow the pans to slide on the shelf when the shelf comes into registry with the lower end of the hearth, the said controller energizing the vibrator to shake the baked goods loose from the pans as the unloader wheel revolves, the said wheel, after the vibrator has dislodged the baked goods from the pans, dropping the separated baked goods by gravity as the wheel turns over, but the controller keeping the magnets energized for holding the pans until the wheel arrives at an advanced point in its revolution whereupon the controller deenergizes the magnets and the pans drop by gravity at a different location beyond where the baked products have been discharged.

10. The combination claimed in claim 9 in which the controller comprises a plurality of ring segments, one a ring segment that extends nearly through a complete circle and acts to energize the solenoid to hold the gate up to arrest the pans and baked products on the declining hearth, another segment that is approximately half a circle which is the pan magnet that energizes the magnets on the shelf to hold the pans on the shelf through substantially half a revolution, and a third ring segment which is a relatively short ring segment which serves to energize the vibrator to loosen the baked goods from the pans, the said controller having three arms which are supported on the hub of the shaft that supports the unloader wheel, these arms being electric contacts that bear on the ring segments to complete the circuits to control and operate the gate, the vibrator and the magnets.

11. The combination claimed in claim 9 in which a hopper is located at the position where the baked goods is discharged to receive the baked goods and a conveyor is located under the hopper to take the baked goods discharged in the hopper and convey them away, and a second hopper is located at the side of the first mentioned hopper and at the position where the pans are released by the magnets and dropped by gravity into the hopper and a second conveyor is located under the second hopper to bear away the pans.

AUSTIN A. HOLBECK.

References Cited in the file of this patent

UNITED STATES PATENTS

| Number | Name | Date |
|--------|------|------|
| 742,663 | Igelmann | Oct. 27, 1903 |
| 1,473,996 | McGarry | Nov. 3, 1928 |
| 2,462,021 | Harker | Feb. 15, 1949 |